United States Patent
Behrens et al.

(10) Patent No.: US 10,023,313 B2
(45) Date of Patent: Jul. 17, 2018

(54) ROPE SUSPENSION DEVICE WITH AT LEAST ONE ROPE SUSPENSION MODULE

(71) Applicant: AIRBUS HELICOPTERS DEUTSCHLAND GMBH, Donauworth (DE)

(72) Inventors: Michael Behrens, Harburg (DE); Rainer Stuetz, Tuntenhausen (DE)

(73) Assignee: AIRBUS HELICOPTERS DEUTSCHLAND GMBH (DE)

( * ) Notice: Subject to any disclaimer, the term of this patent is extended or adjusted under 35 U.S.C. 154(b) by 94 days.

(21) Appl. No.: 15/175,293

(22) Filed: Jun. 7, 2016

(65) Prior Publication Data
US 2016/0368605 A1    Dec. 22, 2016

(30) Foreign Application Priority Data

Jun. 22, 2015 (EP) .................................... 15400025

(51) Int. Cl.
*F16M 13/00* (2006.01)
*B64D 1/22* (2006.01)
*F16M 13/02* (2006.01)

(52) U.S. Cl.
CPC ............... *B64D 1/22* (2013.01); *F16M 13/02* (2013.01)

(58) Field of Classification Search
USPC ........................................................ 248/636
See application file for complete search history.

(56) References Cited

U.S. PATENT DOCUMENTS

| 1,242,809 | A | * | 10/1917 | Irwin | B66C 1/34 244/137.3 |
|---|---|---|---|---|---|
| 1,814,900 | A | | 7/1931 | Deppe | |
| 3,208,787 | A | * | 9/1965 | Cozzoli | B64D 1/22 294/82.33 |
| 3,575,459 | A | * | 4/1971 | Coblenz | B64D 1/22 294/82.32 |
| 3,761,122 | A | * | 9/1973 | Epstein | B66C 1/36 294/82.27 |
| 3,845,978 | A | * | 11/1974 | Huber | B66C 1/34 294/82.3 |
| 4,358,146 | A | | 11/1982 | Goudey | |

(Continued)

OTHER PUBLICATIONS

Extended European Search Report for European Application No. EP 15400025.1, Completed by the European Patent Office, dated Dec. 11, 2015, 7 Pages.

(Continued)

*Primary Examiner* — Monica E Millner
(74) *Attorney, Agent, or Firm* — Brooks Kushman P.C.

(57) ABSTRACT

A rope suspension device with at least one rope suspension module that is adapted for suspension of at least one rope from a rotorcraft, the rope suspension module comprising at least one lockable load beam that is rotatable around an axis of rotation between a locked state and an unlocked state and that is adapted for supporting in the locked state at least one rope that is to be suspended from the rope suspension module, the at least one lockable load beam being, upon unlocking in operation, rotatable from the locked state around the axis of rotation into the unlocked state at least on the basis of a load that is applied to the at least one lockable load beam by means of at least one rope that is supported by the at least one lockable load beam.

20 Claims, 7 Drawing Sheets

(56) References Cited

U.S. PATENT DOCUMENTS

| | | | | |
|---|---|---|---|---|
| 4,441,750 | A | | 4/1984 | Reber |
| 4,471,511 | A | * | 9/1984 | Phipps .................. B63B 23/58 24/601.5 |
| 5,100,192 | A | * | 3/1992 | McMillan ............... B63B 21/04 294/82.31 |
| 5,123,374 | A | * | 6/1992 | McMillan ............... B63B 21/60 114/230.3 |
| 5,158,247 | A | | 10/1992 | Ferrier |
| 5,364,145 | A | * | 11/1994 | Epstein .................. B63B 21/60 114/252 |
| 5,593,113 | A | * | 1/1997 | Cox ........................ B64D 1/08 177/245 |
| 5,887,924 | A | * | 3/1999 | Green ..................... B64D 1/22 294/75 |
| 6,023,927 | A | * | 2/2000 | Epstein .................. F16G 15/06 59/85 |
| 6,948,586 | B1 | | 9/2005 | Saucedo |
| 8,998,280 | B1 | * | 4/2015 | McMillan ............... B63B 21/08 294/82.33 |
| 9,056,678 | B2 | * | 6/2015 | Forsans ................. B64D 17/56 |
| 2002/0162201 | A1 | | 11/2002 | Liu |
| 2011/0042984 | A1 | | 2/2011 | Rocourt et al. |
| 2013/0199024 | A1 | * | 8/2013 | Grumberg ............. F16M 13/02 29/525.08 |

OTHER PUBLICATIONS

Federal Aviation Regulations Index CS-27, attached to European Aviation Safety Agency CS-27 Amendment 1, Dated Nov. 30, 2007, All together 101 Pages,"Certification Specifications for Small Rotorcraft".

Federal Aviation Regulations Index CS-27, attached to European Aviation Safety Agency CS-27 Amendment 2, Dated Nov. 17, 2008, All together 93 Pages,"Certification Specifications for Small Rotorcraft".

Federal Aviation Regulations Index CS-27, attached to European Aviation Safety Agency CS-27 Amendment 3, Dated Dec. 11, 2012, All together 95 Pages,"Certification Specifications for Small Rotorcraft".

Federal Aviation Regulations Index CS-27, attached to European Aviation Safety Agency CS-27 Initial Copy, Dated Nov. 14, 2003, All together 100 Pages,"Certification Specifications for Small Rotorcraft".

Federal Aviation Regulations Index CS-29, attached to European Aviation Safety Agency CS-29 Initial Copy, Dated Nov. 14, 2003, All together 129 Pages,"Certification Specifications for Large Rotorcraft".

Federal Aviation Regulations Index CS-29, attached to European Aviation Safety Agency CS-29 Amendment 1, Dated Nov. 30, 2007, All together 128 Pages,"Certification Specifications for Large Rotorcraft".

Federal Aviation Regulations Index CS-29, attached to European Aviation Safety Agency CS-29 Amendment 2, Dated Nov. 17, 2008, All together 120 Pages,"Certification Specifications for Large Rotorcraft".

Federal Aviation Regulations Index CS-29, attached to European Aviation Safety Agency CS-29 Amendment 3, Dated Dec. 11, 2012, All together 137 Pages,"Certification Specifications for Large Rotorcraft".

* cited by examiner

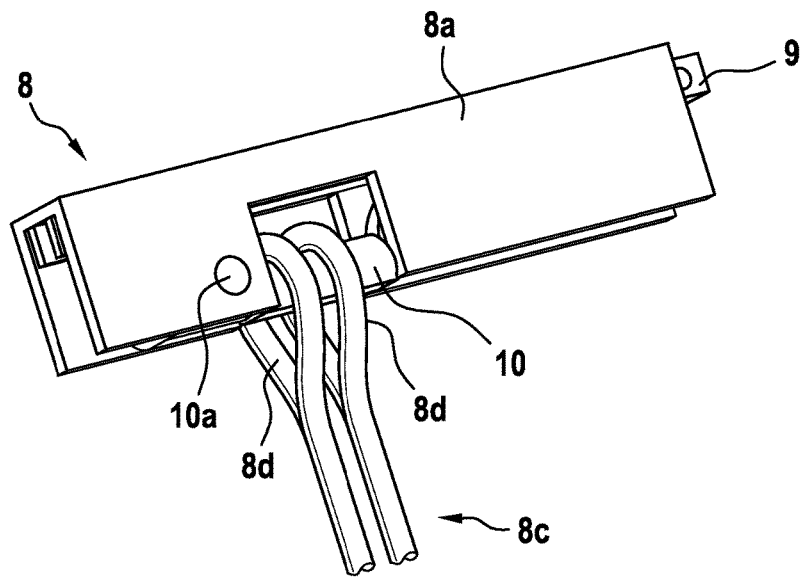
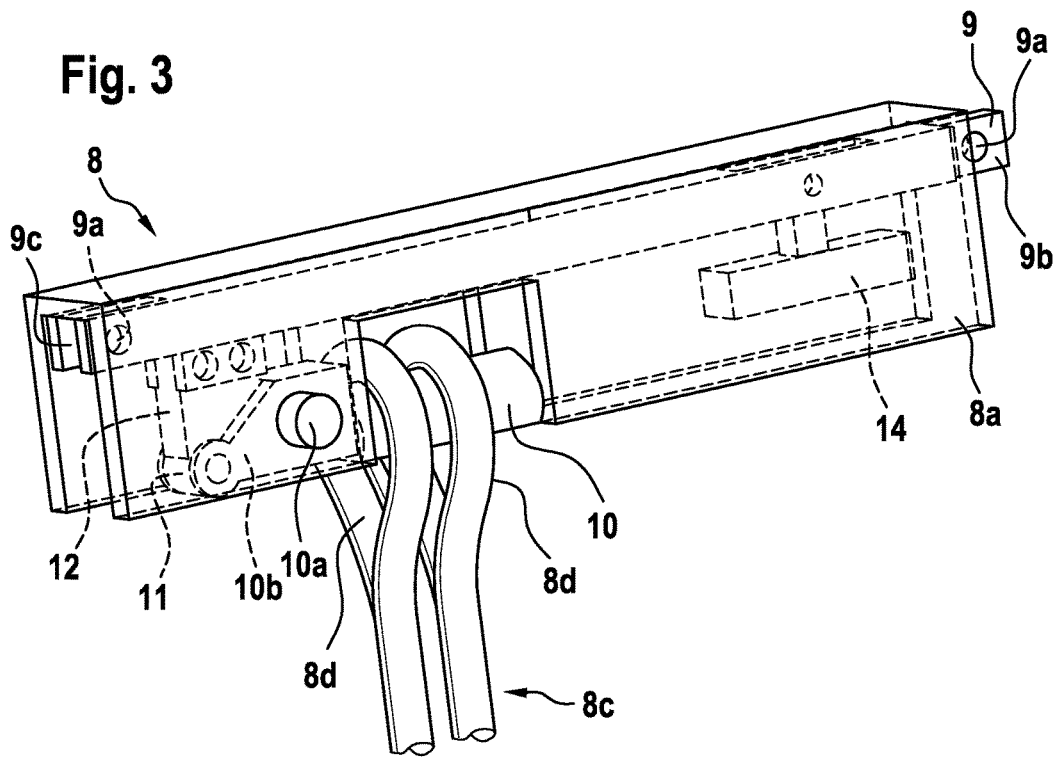

ROPE SUSPENSION DEVICE WITH AT LEAST ONE ROPE SUSPENSION MODULE

CROSS REFERENCE TO RELATED APPLICATION

This application claims priority to European patent application No. EP 15400025.1 filed on Jun. 22, 2015, the disclosure of which is incorporated in its entirety by reference herein.

BACKGROUND OF THE INVENTION (1) Field of the Invention

The invention is related to a rope suspension device with at least one rope suspension module that is adapted for suspension of at least one rope from a rotorcraft, said rope suspension device comprising the features of claim 1.

(2) Description of Related Art

Rotorcrafts, and in particular helicopters, are commonly used for rappelling, extraction and insertion tasks during special helicopter operations using suitable ropes that are suspended from the helicopters. For instance, helicopters are used for rapidly descending, i.e. rappelling, of persons from a given height, for extracting persons from a given area and/or for inserting persons into a given area. Furthermore, helicopters are used in transportation and delivery of cargo, e.g. for military purposes or in the construction sector. More generally, helicopters can be used in any special operation that requires application of one or more ropes that are suspended from the helicopters.

Usually, the one or more ropes are suspended from the helicopters by means of associated rope suspension devices, which require a high degree of safety, in particular if human external cargo (HEC) is implied. Furthermore, designing and constructing such rope suspension devices requires the compliance with applicable safety regulations and specifications, such as the US-American Federal Aviation Regulations (FAR) and/or the European Certification Specifications (CS). For instance, according to FAR29/CS29 and FAR27/CS27, suspended ropes that are under tension in operation must be releasable until up to 3.5 times of an underlying rated load therefore and they must have a comparatively simple design to reach requested $10^{-9}$ safety requirements for HEC.

However, conventional rope suspension devices are usually not adapted for allowing a quick release of a suspended rope if the rope is under tension, due to a comparatively high reacting force on an underlying release mechanism. For instance, if the suspended rope is jammed under a stone or other item, a cabin operator within the helicopter is needed for cutting the rope by means of a knife. Nevertheless, e.g. in a rescue situation, a helicopter may not provide a sufficiently stable platform and in case of winds or gust there is a high risk for injury of the cabin operator when trying to cut the rope with the knife.

The document U.S. Pat. No. 5,158,247 B1 describes a rope suspension device for a helicopter that comprises a beam fixed to the helicopter floor or roof in the vicinity of an opening. Ropes for the lowering to the ground of persons are attached to bolts by rings. The operation of a handle makes it possible to simultaneously and instantaneously release or jettison all the ropes by pivoting a clasp into each of the bolts in opposition to a spring. For this purpose the handle simultaneously operates pivoting latches, which cooperate with the clasps by complimentary cam surfaces. More specifically, each clasp is mounted so as to pivot for applying the forces that are induced by an end ring of a given rope to the clasp, which is substantially the direction of the end of the rope connected to the ring, when said rope is made taut by a load that it carries. In this case, it would not be possible for the clasp to open under the stresses of the loaded rope, because the force exerted by the ring against the clasp can in no case stress the latter in the opening direction.

However, this means that in this rope suspension device an application of force along the rope in a direction that points away from the rope suspension device strongly pivots the clasp towards its closed position, so that a required actuation force for activating, i.e. operating the handle would be so high, that it would not be possible for an operator to release the rope. Thus, an easy and quick release of the rope under any foreseeable condition is not guaranteed, especially if the 3.5 g and a safety factor of 1.5 according to the latest certification requirements according to FAR29/CS29 and FAR27/CS27 are applied. Furthermore, this rope suspension device is comparatively complex and requires a multiplicity of constituent components, each of which could at least in part cause an unintended opening of the rope suspension device in case of a failure.

The document U.S. Pat. No. 6,948,586 B1 describes a quick rope release device that can be used by persons in rapidly descending from a helicopter using a rope and then quickly disengaging from the rope. This quick rope release device comprises a body having a rim which defines a rope opening therein. The body is further adapted to be affixed to a harness. A lock extends across the rope opening. The lock frictionally engages a rope extending through the rope opening. A retracting mechanism manually releases the lock from engagement with the rope. The retracting mechanism is biased to a secured position, whereby the lock is engaged with the rope. The retracting mechanism, when actuated, manually releases the lock to an open position, whereby the rope is quickly released from the lock.

However, this quick rope release device is not installed in the helicopter, but on the harness, which is close to the person on the rope. Thus, if the rope is e.g. jammed under a stone or other item, it cannot be released quickly from within the helicopter and a cabin operator within the helicopter is again needed for cutting the rope by means of a knife.

BRIEF SUMMARY OF THE INVENTION

It is, therefore, an object of the present invention to provide a new rope suspension device for a rotorcraft that is installed in the rotorcraft, that allows a quick release of suspended ropes in any foreseeable operating conditions and that fulfills all safety regulations and specifications as well as certification requirements according to FAR29/CS29 and FAR27/CS27.

This object is solved by a rope suspension device with at least one rope suspension module that is adapted for suspension of at least one rope from a rotorcraft, said rope suspension device comprising the features of claim 1.

More specifically, according to the present invention a rope suspension device comprises at least one rope suspension module that is adapted for suspension of at least one rope from a rotorcraft. The rope suspension module comprises at least one lockable load beam that is rotatable around an axis of rotation between a locked state and an unlocked state and that is adapted for supporting in the locked state at least one rope that is to be suspended from the rope suspension module. The at least one lockable load beam is, upon unlocking in operation, rotatable from the locked state around the axis of rotation into the unlocked state at least on the basis of a load that is applied to the at least one lockable load beam by means of at least one rope that is supported by the at least one lockable load beam.

It should be noted that in the context of the present invention the term "rope" is meant to comprise any rope or cord that can be suspended from a rotorcraft. In particular, such ropes or cords comprise any textile ropes and cords. However, it should be noted that the inventive rope suspension device can likewise be designed for suspension of metallic cables and wires.

Advantageously, the inventive rope suspension device can be used in any special operation that requires application of one or more ropes that are suspended from a given rotorcraft and, more specifically, in any rappelling, extraction and insertion tasks during special operations as well as for transportation and delivery of cargo. The cargo, and in particular HEC, may also be attached to an associated suspended rope prior to begin of a flight mission of the given rotorcraft. However, in any case each suspended rope can be released quickly and securely in any foreseeable operating conditions, in particular also if the rope is under tension. Furthermore, the inventive rope suspension device complies with all applicable safety regulations and specifications, as well as certification requirements, in particular according to FAR29/CS29 and FAR27/CS27, and has a very uncomplicated and simple design that allows compliance with the above-described $10^{-9}$ safety requirements for HEC.

According to one aspect of the present, the inventive rope suspension device allows an alignment of a plurality of inventive rope suspension modules in the form of a rope suspension line, so that a simultaneous operation with a plurality of suspended ropes is enabled. Such a rope suspension line, i.e. the rope suspension device, can be installed with a longitudinal or a lateral, i.e. oblique orientation in or on a given rotorcraft. Furthermore, the rope suspension line, i.e. its lockable load beams, can e.g. advantageously be unlocked manually by a corresponding operator who monitors and operates the rope suspension line during a corresponding flight mission. However, such a rope suspension line can preferably be operated mechanically, i.e. actuated electrically and triggered e.g. by a pilot of the respective rotorcraft. Thus, there is no need for a specific, additional operator on board of the rotorcraft. Such a mechanical operation can e.g. be performed hydraulically or by means of a Bowden cable.

Advantageously, by enabling a rotation of each lockable load beam, upon unlocking in operation, from the locked state around its axis of rotation into the unlocked state on the basis of a load that is applied to the lockable load beam by means of at least one rope that is supported by this lockable load beam, a secure and reliable release of the at least one rope is at least essentially independent of an underlying angle with which the at least one rope is taut away from the lockable load beam. Furthermore, the at least one rope may simply be provided with a rope loop for suspension from the lockable load beam, so that a provision of e.g. rigid metal rings can be omitted. This is beneficial, as a release of ropes with rigid rings is particularly dangerous for persons on ground below the rotorcraft and a comparatively high risk for severe and potentially perilous injury of these persons arises, specifically if a given fall height of the rigid metal rings becomes sufficiently great.

According to a preferred embodiment, the at least one lockable load beam is provided with a hinge. The hinge is pivotally mounted to an associated support member.

According to a further preferred embodiment, the hinge is pivotally mounted to the associated support member by means of an associated hinge pin. The hinge pin defines the axis of rotation.

According to a further preferred embodiment, the associated support member is adapted for mounting the rope suspension module to an associated support structure of a rotorcraft.

According to a further preferred embodiment, at least one locking element is provided that is moveable between at least a first and a second position. The at least one locking element is adapted for locking the at least one lockable load beam in the first position and for unlocking the at least one lockable load beam in the second position.

According to a further preferred embodiment, the hinge is provided with an associated failsafe element. The failsafe element is adapted for allowing a rotation of the at least one lockable load beam from the locked state around the axis of rotation into the unlocked state only if the at least one locking element is moved to the second position.

According to a further preferred embodiment, the at least one locking element comprises a first inclined edge and the hinge comprises a second inclined edge. The first inclined edge is adapted for blocking the second inclined edge in the locked state of the at least one lockable load beam.

According to a further preferred embodiment, the hinge is provided with a bearing. The bearing is adapted for moving along the at least one locking element in operation during a rotation of the at least one lockable load beam around the axis of rotation from the locked state into the unlocked state.

According to a further preferred embodiment, the at least one locking element is connected to an actuating member that is activatable for moving in operation the at least one locking element from the first position into the second position.

According to a further preferred embodiment, the actuating member comprises at least one elongated bar that is moveably mounted to the associated support member.

According to a further preferred embodiment, the at least one elongated bar is translationally movable in its longitudinal direction along the associated support member for moving the at least one locking element from the first position into the second position.

According to a further preferred embodiment, the at least one elongated bar is at least approximately arranged in parallel to a longitudinal axis of the at least one lockable load beam in locked state.

According to a further preferred embodiment, at least one keeper is provided. The at least one keeper is moveable from a latching position into an unlatching position, wherein in the latching position of the at least one keeper a rope that is supported by the at least one lockable load beam in locked state is secured on the at least one lockable load beam, and wherein in the unlatching position of the at least one keeper an additional rope can be mounted to the at least one lockable load beam in locked state.

According to a further preferred embodiment, at least one operable security element is provided for blocking the at least one keeper in the latching position.

According to a further preferred embodiment, a dampening element is provided for dampening the at least one lockable load beam upon reaching of the unlocked state after a rotation from the locked state around the axis of rotation into the unlocked state.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 2 shows a perspective view of a rope suspension module of FIG. 1, FIG. 3 shows a partly transparent perspective view of the rope suspension module of FIG. 2.

DETAILED DESCRIPTION OF THE INVENTION

Figure 1:
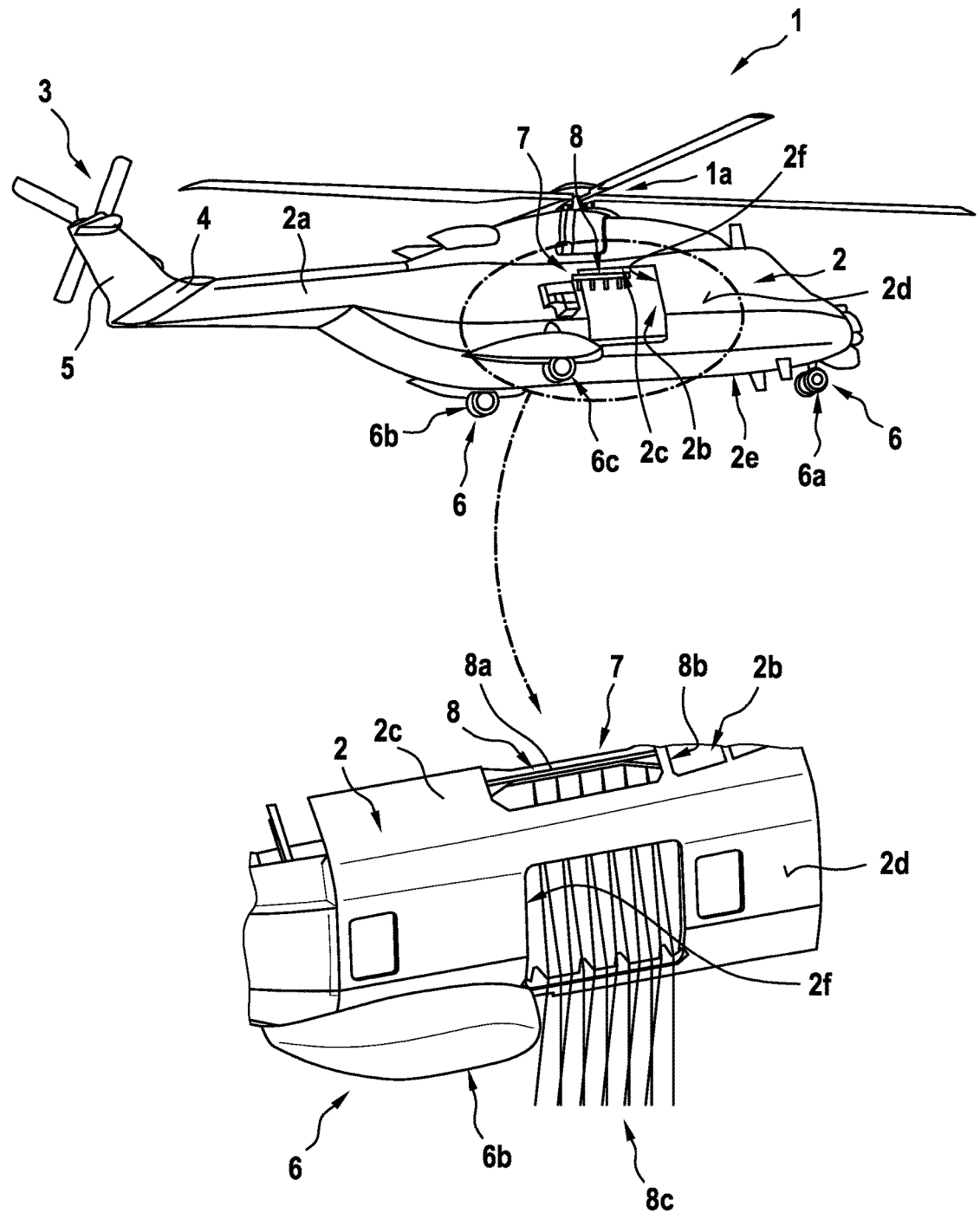
FIG. 1 shows a perspective view of a rotorcraft and an enlarged perspective view of a rope suspension device with a plurality of rope suspension modules of said rotorcraft according to the invention.

FIG. 1 shows a rotorcraft 1, which is by way of example embodied, and therefore hereinafter for simplicity also referred to, as a helicopter. The helicopter 1 illustratively comprises a fuselage 2 with a bottom shell 2e and a starboard side wall 2d that is provided with a starboard side sliding door opening 2f. On the helicopter's board side, the fuselage 2 preferably comprises a board side wall that is provided with a board side sliding door opening. The fuselage 2 exemplarily further comprises a tail boom 2a and a cabin 2b with a cabin ceiling 2c.

The helicopter 1 illustratively comprises a landing gear 6, which is exemplarily embodied as a wheel-type landing gear that comprises associated landing gear nose wheels 6a, a board side rear wheel 6b and a starboard side rear wheel 6c. The helicopter 1 illustratively further comprises at least one main rotor 1a configured to provide lift and forward or backward thrust during operation, and at least one counter-torque device 3 configured to provide counter-torque during operation, i.e. to counter the torque created by rotation of the at least one main rotor 1a for purposes of balancing the helicopter 1 in terms of yaw.

The at least one counter-torque device 3 is illustratively provided at an aft section of the tail boom 2a, which preferably further comprises a tail wing 4 and a fin 5. The tail wing 4 is preferably adjustable in its inclination and can, thus, overtake the functioning of a horizontal stabilizer. Alternatively, or in addition, the helicopter 1 is provided with a suitable horizontal stabilizer.

However, it should be noted that the at least one counter-torque device 3, the tail wing 4 as well as the fin 5 provided at the aft section of the tail boom 2a are merely described for illustrating one exemplary embodiment of the helicopter 1 and not for limiting the invention accordingly. Instead, the present invention as described hereinafter can likewise be applied to any helicopter, independent of a respective construction of the aft section thereof.

According to one aspect of the present invention, the helicopter 1 is provided with a rope suspension device 7. The latter is preferably attached to the cabin ceiling 2c by means of an associated support structure 8b that is defined by or rigidly attached to the fuselage 2. Preferentially, the rope suspension device 7 is embodied as a modular quick release rope suspension device and comprises at least one and, illustratively, a plurality of rope suspension modules 8. Each rope suspension module 8 is preferably adapted for suspension of at least one rope 8c from the helicopter 1 and comprises an associated support frame 8a, which is preferentially adapted for attachment to the associated support structure 8b provided at the cabin ceiling 2c.

FIG. 2 shows a single rope suspension module 8 of the rope suspension device 7 of FIG. 1. According to one aspect of the present invention, this rope suspension module 8 comprises at least one support member 8a and at least one lockable load beam 10 that is rotatable relative to the support member 8a around an axis of rotation 10a between a locked state and an unlocked state.

The support member 8a is preferentially embodied as a frame-like structure and, therefore, also referred to as the "support frame" hereinafter. Preferably, the support frame 8a is adapted for mounting the rope suspension module 8 to the support structure 8b provided at the cabin ceiling 2c of the helicopter 1 of FIG. 1.

According to one aspect of the present invention, the lockable load beam 10 is rotatable from the locked state around the axis of rotation 10a into the unlocked state upon unlocking in operation. Such an unlocking can preferably be performed by means of an actuating member 9, as described in more detail below with reference to FIG. 4.

The lockable load beam 10 is preferably adapted for supporting in the locked state at least one rope of the ropes 8c of FIG. 1 that is to be suspended from the rope suspension module 8. Illustratively, two ropes 8c, each having an associated rope attachment loop 8d, are supported by the lockable load beam 10 by means of their associated rope attachment loops 8d.

FIG. 3 shows the rope suspension module 8 of FIG. 2 with the support frame 8a, the actuating member 9 and the lockable load beam 10 that supports the two ropes 8c by means of their associated rope attachment loops 8d. The lockable load beam 10 is rotatable around the axis of rotation 10a of FIG. 2, which is preferably defined by a hinge pin 10a of a hinge 10b.

More specifically, according to one aspect of the present invention, the lockable load beam 10 is provided with the hinge 10b, which is preferably pivotally mounted to the support frame 8a by means of the hinge pin 10a. The lockable load beam 10 and the hinge 10b can be embodied as an integral, one-piece component. Alternatively, the lockable load beam 10 can be attached to the hinge 10b by any suitable attachment means and/or e.g. be retained at the hinge 10b by means of the hinge pin 10a.

According to one aspect of the present invention, the hinge 10b is provided with a bearing 11. This bearing 11 is preferably arranged on an axial end, i.e. a face side of the hinge 10b that points away from the lockable load beam 10. Preferentially, the bearing 11 is adapted for moving along at least one locking element 12 in operation during a rotation of the lockable load beam 10 around the axis of rotation 10a from the locked state into the unlocked state, as described in more detail below with reference to FIG. 4.

Preferably, the locking element 12 is connected to the actuating member 9. The latter preferentially comprises at least one activatable elongated bar that is moveably mounted to the support frame 8*a*. This can be done by any suitable means, even means that are well-known to the person skilled in the art. The elongated bar 9 optionally comprises a damper 14 that is provided for dampening movements of the elongated bar 9.

According to one aspect of the present invention, the elongated bar 9 comprises a bar insertion section 9*b* at one of its axial ends and a bar reception section 9*c* at its other axial end. The bar insertion section 9*b* and the bar reception section 9*c* preferably comprise at least similar attachment openings 9*a*. Thus, the bar insertion section 9*b* of the rope suspension module 8 can e.g. be inserted into a bar reception section 9*c* of an elongated bar 9 of another, adjacently arranged rope suspension module 8, so that the elongated bars 9 of both can be connected, e.g. by inserting a bolt or rivet through the respective attachment openings 9*a*. Likewise, the bar reception section 9*c* of the rope suspension module 8 can e.g. receive a bar insertion section 9*b* of an elongated bar 9 of another, adjacently arranged rope suspension module 8, so that the elongated bars 9 of both can be connected, e.g. by inserting a bolt or rivet through the respective attachment openings 9*a*.

Similarly, suitable means for connecting support frames 8*a* of adjacent rope suspension modules 8 can be provided such that they can be connected to define the rope suspension device 7 of FIG. 1. However, it should be noted that this is merely optional, as an alignment of adjacent rope suspension modules 8 to the rope suspension device 7 of FIG. 1 can also be done by merely attaching the respective support frames 8*a* besides each other to the cabin ceiling 2*c* of the helicopter 1 of FIG. 1.

According to one aspect of the present invention, load transfer from the ropes 8*c* to the support frame 8*a* occurs via the lockable load beam 10 and the bearing 11 to the locking element 12 and from there to the elongated bar 9. As the latter is supported by the support frame 8*a*, the loads are finally transferred from the elongated bar 9 to the support frame 8*a*.

Figure 4:
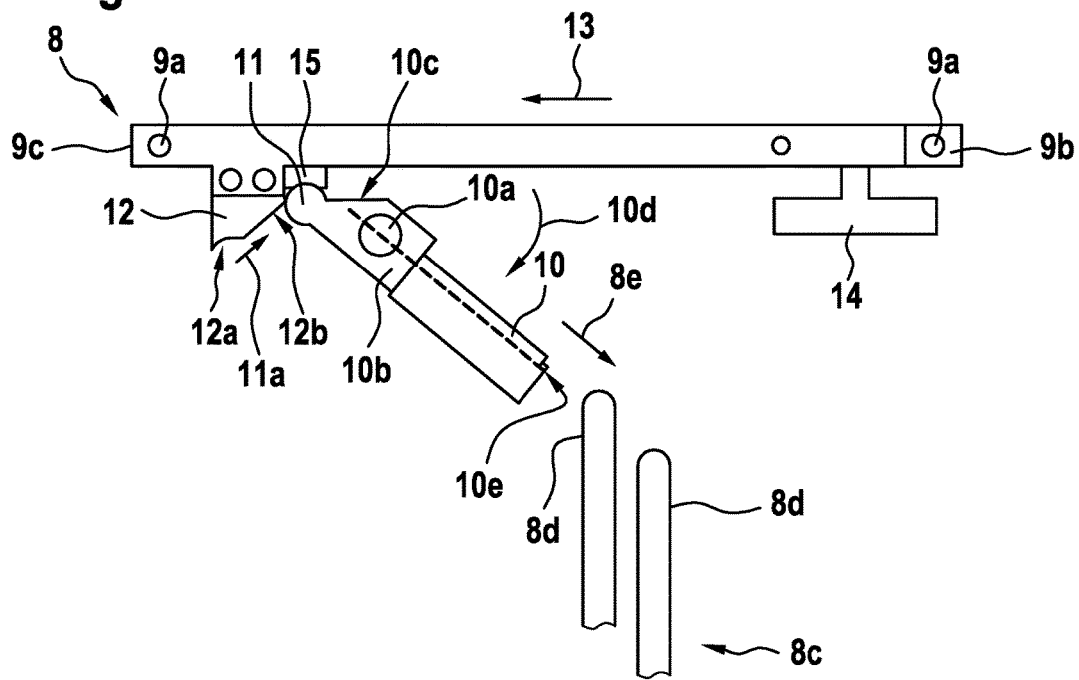
FIG. 4 shows a simplified lateral view of the rope suspension module of FIG. 3 in operation.

FIG. 4 shows the rope suspension module 8 of FIG. 2 and FIG. 3 without the support frame 8*a* for illustrating an exemplary quick release operation thereof by means of unlocking the lockable load beam 10 according to the present invention. Preferably, such a quick release operation is initiated by activating the activatable elongated bar 9 such that the latter moves the locking element 12 from a first position illustrated in FIG. 3 into a second position illustrated in FIG. 4. Such a movement can be initiated manually or mechanically, e.g. by a suitable drive motor, hydraulically or by means of a Bowden cable. Such a drive motor can e.g. be actuated electrically and triggered by way of example by a pilot of the helicopter 1 of FIG. 1.

More specifically, the activatable elongated bar 9 is preferentially translationally movable in its longitudinal direction, as indicated by an arrow 13, along the support frame 8*a* of FIG. 3, for moving the locking element 12 from the first position into the second position. The direction of the arrow 13 thus represents a quick release movement direction of the activatable elongated bar 9.

According to one aspect of the present invention, the locking element 12 is adapted for locking the lockable load beam 10 in the first position and for unlocking the lockable load beam 10 in the second position. Therefore, the locking element 12 preferably comprises a bearing receptacle 12*a* and a first inclined edge 12*b*, and the hinge 10*b* comprises a second inclined edge 10*c*. The first inclined edge 12*b* is preferentially adapted for blocking the second inclined edge 10*c* in the locked state of the lockable load beam 10, as illustrated in FIG. 3, wherein the bearing 11 is received and retained in the bearing receptacle 12*a*.

However, when moving the locking element 12 from the first position into the second position, the bearing 11 is released from, i.e. glides out of the bearing receptacle 12*a* and thereby reduces a required release force that must be applied to the activatable elongated bar 9. The bearing 11 can then glide along the first inclined edge 12*b* of the locking element 12 in a direction 11*a*. Accordingly, the lockable load beam 10 rotates by means of the hinge 10*b* from the locked state around the axis of rotation, i.e. the hinge pin 10*a* into a release rotating direction 10*d* into the unlocked state. This rotation is preferably at least caused on the basis of a load that is applied to the lockable load beam 10 by means of the ropes 8*c* that are supported by the lockable load beam 10.

Preferably, the rotation is stopped by an optional dampening element 15 against which the bearing 11 abuts at a predetermined rotation end position. The optional dampening element 15 is preferentially provided for dampening the lockable load beam 10 upon reaching of the unlocked state after the rotation from the locked state around the axis of rotation 10*a* into the unlocked state. Consequently, it defines a soft stop for the lockable load beam 10 and reliably avoids any damage.

At the latest when the lockable load beam 10 reaches the illustrated unlocked state, the ropes 8*c* are released from the lockable load beam 10. More specifically, in response to the load that is applied by the ropes 8*c* to the lockable load beam 10, at least by their own weight, the ropes 8*c* glide into a release movement direction 8*e* along the lockable load beam 10 until falling off the latter and are, thus, no more supported by the lockable load beam 10.

It should be noted that the gliding movement of the ropes 8*c* and the release force that they consequently apply to the lockable load beam 10 also accelerates movement of the activatable elongated bar 9 for comparatively high load release forces. If the elongated bar is operated manually, its acceleration will advantageously be damped by the damper 14.

This gliding movement is preferably enabled by a predetermined inclination angle between the activatable elongated bar 9 and a longitudinal axis 10*e* of the lockable load beam 10 in its unlocked state, which illustratively amounts to approximately 45°, while the activatable elongated bar 9 is at least approximately arranged in parallel to the longitudinal axis 10*e* in the locked state, as illustrated in FIG. 3. However, other inclination angles are likewise realizable and fall within the common knowledge of the person skilled in the art, e.g. inclination angles in a range between 25° to 90°.

Insertion of the ropes 8*c* onto the lockable load beam 10 is preferred by rotating the lockable load beam 10 into the unlocked state illustrated in FIG. 4. Then, the attachment loops 8*d* of the ropes 8*c* are arranged on the lockable load beam 10 and the activatable elongated bar 9 is moved into the position illustrated in FIG. 2 and FIG. 3, whereby the lockable load beam 10 is closed, i.e. rotated into its locked state, due to the predetermined shaping of the locking element 12.

Figure 5:
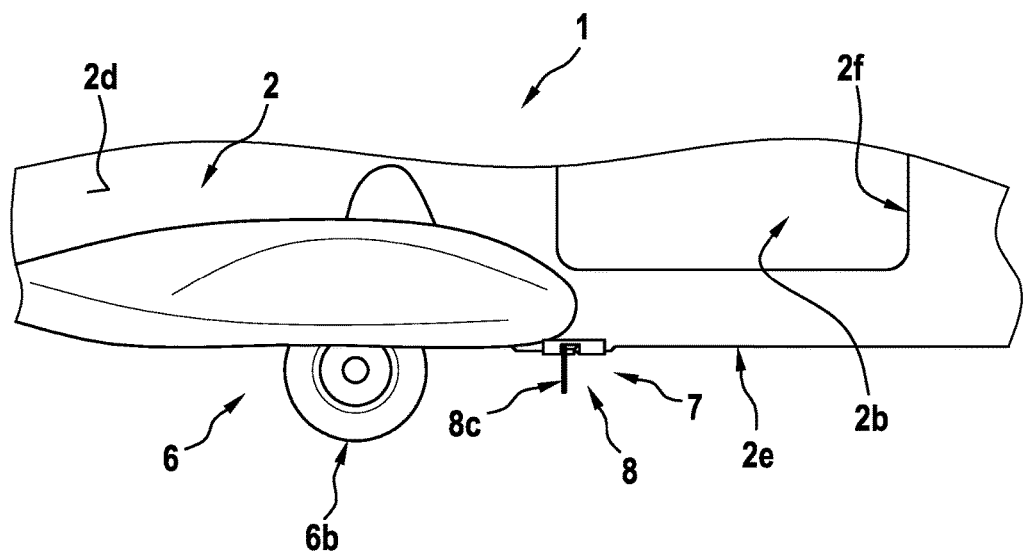
FIG. 5 shows a lateral view of the rotorcraft of FIG. 1 with an alternative attachment of the rope suspension device of FIG. 1.

FIG. 5 shows the helicopter 1 of FIG. 1 with the fuselage 2 and the rope suspension device 7 of FIG. 1. However, in contrast to FIG. 1, the rope suspension device 7 is now mounted laterally, and exemplarily obliquely, i.e. at least approximately perpendicular, to the bottom shell 2*e* of the fuselage 2, instead of the mounting with longitudinal orientation to the cabin ceiling 2*c* of the fuselage 2 according to FIG. 1.

Figure 6:
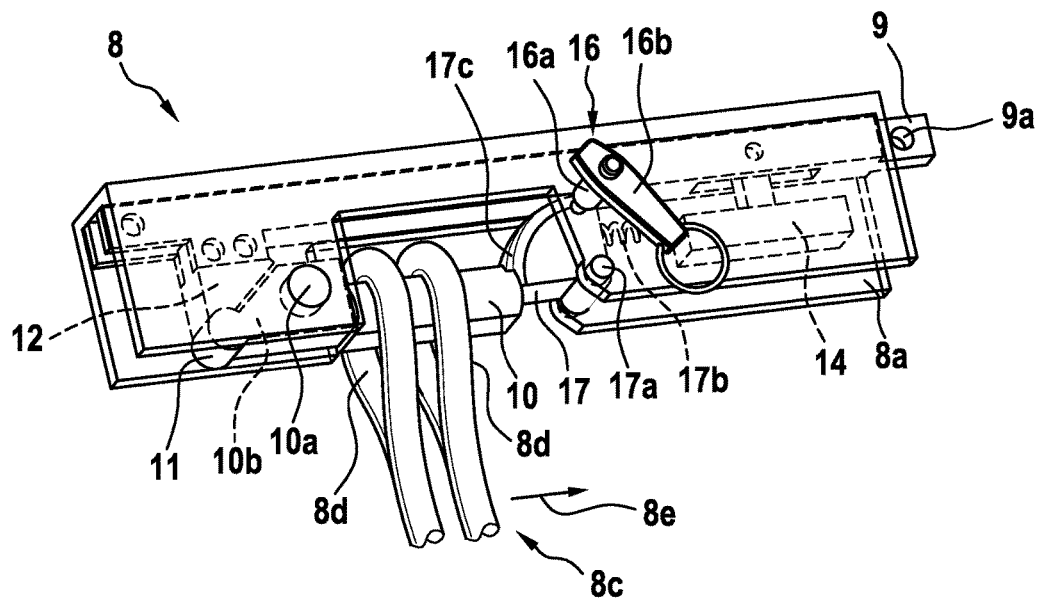
FIG. 6 shows the rope suspension module of FIG. 2 with an optional keeper and an associated security device.

FIG. 6 shows the rope suspension module 8 of FIG. 3 with the lockable load beam 10 that supports the ropes 8c of FIG. 3. However, in contrast to FIG. 3 the rope suspension module 8 is now exemplarily provided with at least one operable security element 16 and at least one keeper 17 according to one aspect of the present invention.

The keeper 17 is preferably moveable from a latching position, which is illustrated in FIG. 6, into an unlatching position, which is illustrated and described below with reference to FIG. 7. Preferentially, the keeper 17 is preloaded into its latching position by means of a return spring 17b, which is exemplarily arranged between the keeper 17 and the damper 14 of the rope suspension module 8.

Preferentially, the keeper 17 is rotatable around an associated rotation axis defined by a rotating pin 17a, by means of which the keeper 17 is preferably pivotally mounted to the support frame 8a of the rope suspension module 8. By way of example, the keeper 17 comprises a round edge 17c that is illustratively oriented towards the lockable load beam 10.

In the latching position, the keeper 17 secures the ropes 8c that are supported by the lockable load beam 10 in its locked state on the lockable load beam 10. In other words, if the ropes 8c move in their release movement direction 8e along the lockable load beam 10 in its locked state, they are nevertheless blocked by the keeper 17 in its latching position and may, thus, not fall off the lockable load beam 10 in its locked state.

According to one aspect of the present invention, the operable security element 16 is provided for blocking the keeper 17 in its latching position by means of an associated security pin 16a, which can preferably be blocked relative to the support frame 8a. Preferentially, the operable security element 16 can be operated for being unblocked by means of an associated handle 16b, e.g. by pulling the handle 16b away from the rope suspension device 8, such that rotation of the keeper 17 around the rotating pin 17a is enabled.

Figure 7:
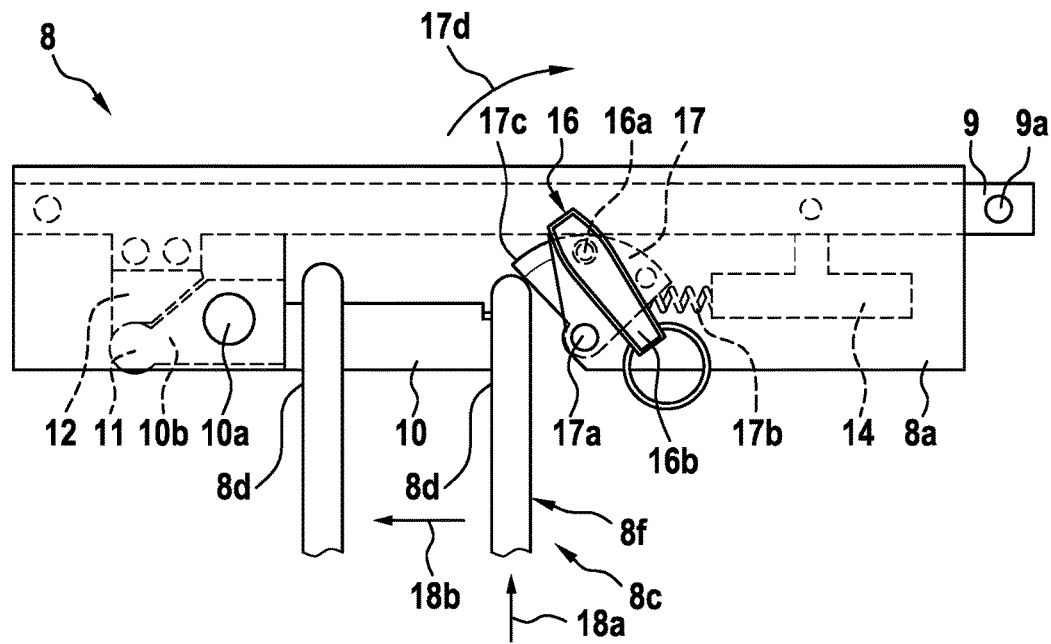
FIG. 7 shows a partly transparent view of the rope suspension module of FIG. 6, FIG. 8 to FIG. 10 show a simplified lateral view of the rope suspension module of FIG. 7 in operation.

FIG. 7 shows the rope suspension module 8 of FIG. 6 with the lockable load beam 10 in its locked state, the operable security element 16 and the keeper 17, which is now illustrated in its unlatching position. In comparison with FIG. 6, the keeper 17 is rotated from its latching position around the rotating pin 17a in a rotating direction 17d into the unlatching position, after unblocking of the security pin 16a of the security element 16.

In the unlatching position of the keeper 17, an additional rope 8f can be mounted to the lockable load beam 10 in locked state. This can be performed by pushing the additional rope 8f in a translational push motion direction 18a towards the keeper 17 into the illustrated position. Then, the additional rope 8f can be glided on the lockable load beam 10 in locked state by means of a translational slide motion, as illustrated with an arrow 18b.

According to one aspect of the present invention, by pushing the additional rope 8f in the translational push motion direction 18a towards the keeper 17 into the illustrated position, the keeper 17 is rotated from its latching position illustrated in FIG. 6 into its unlatching position. Thus, a particular operation for rotating the keeper 17 into its unlatching position is not required.

Figure 8:
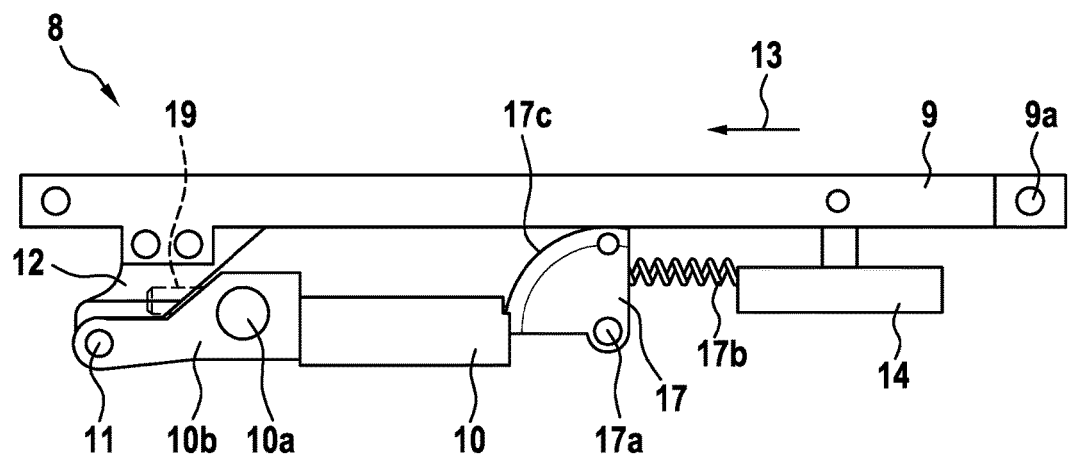
Figure 9:
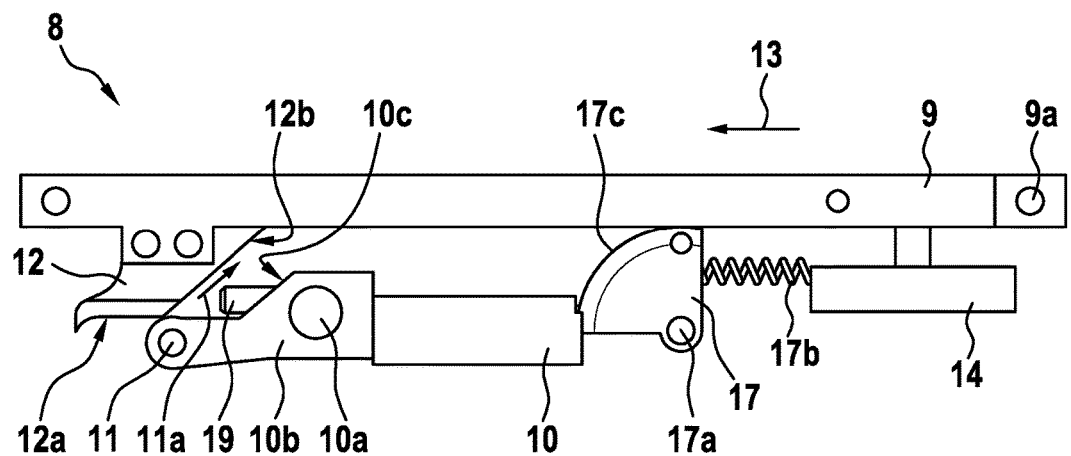
Figure 10:
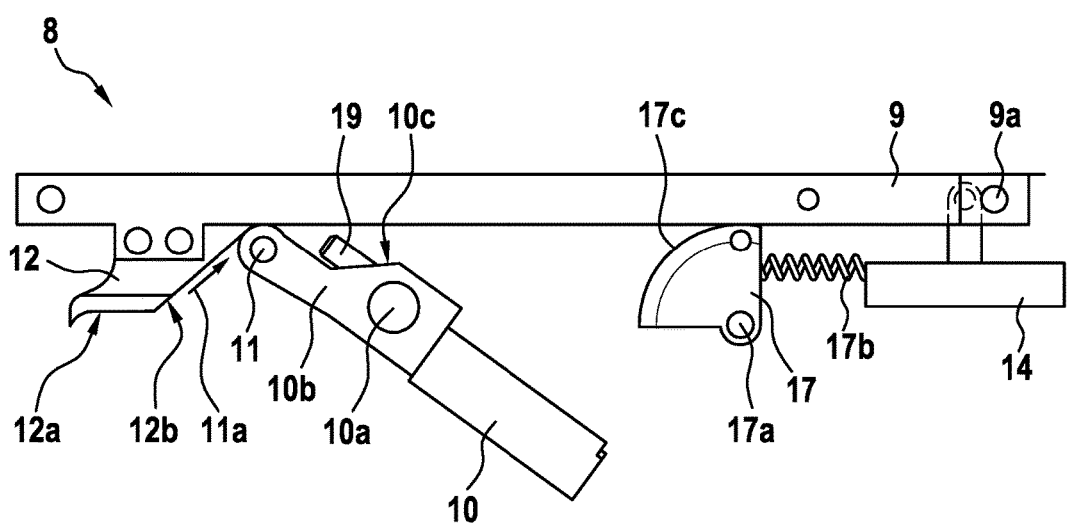

FIG. 8 to FIG. 10 show the rope suspension module 8 of FIG. 6 with the keeper 17 in its latching position, for illustrating an exemplary quick release operation thereof by means of unlocking the lockable load beam 10 according to the present invention. Preferably, execution of this quick release operation is identical to the quick release operation described above with reference to FIG. 4, so that a detailed description thereof can be omitted for brevity and conciseness. However, it should be noted that during the whole illustrated quick release operation the keeper 17 may remain in its latching position.

It should be noted that for simplicity and clarity of the drawings, illustration of the support frame 8a and the security element 16 are omitted in FIG. 8 to FIG. 10 compared to FIG. 6. However, in contrast to FIG. 6 the rope suspension module 8 is now shown with an additional element in the form of a failsafe element 19. The latter is mounted to the hinge 10b of the lockable load beam 10 and preferably adapted for allowing a rotation of the lockable load beam 10 from its locked state around the axis of rotation that is defined by the hinge pin 10a into its unlocked state only, if the locking element 12 is moved to its second position as described above, preferentially completely as illustrated in FIG. 9. Consequently, even if e.g. a breakage of the hinge 10b occurs in the region of the bearing 11, a rotation of the hinge 10b is prevented by the failsafe element 19, which is preferably bolt- or pin-shaped and engages the locking element 12. The failsafe element 19 can further be adapted to transfer loads and support guidance of the lockable load beam 10.

Figure 11:
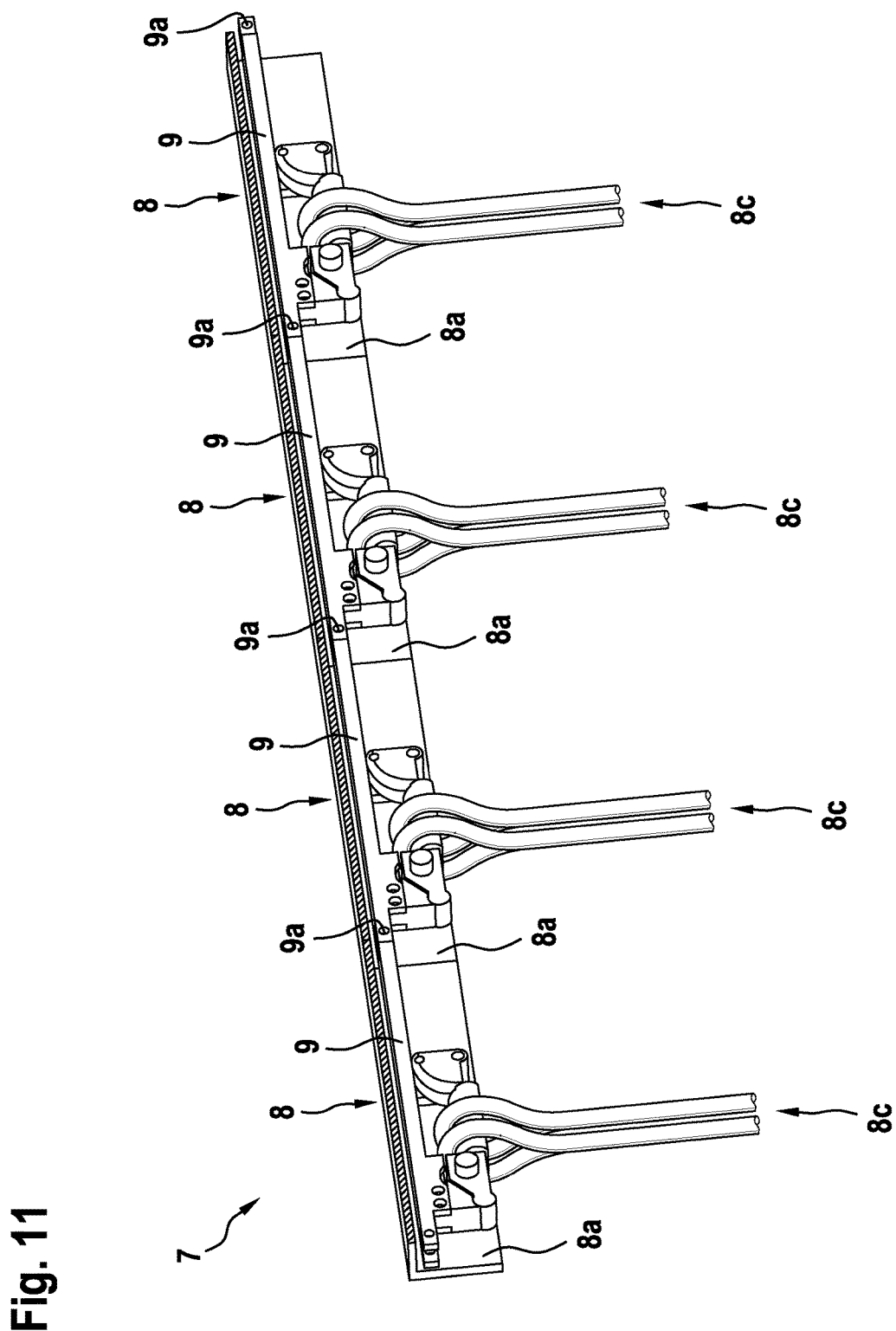
FIG. 11 shows a perspective view of a rope suspension device with a plurality of rope suspension modules of FIG. 6.

FIG. 11 shows the rope suspension device 7 of FIG. 1 in modular form, which is now, illustratively, comprised of four aligned rope suspension modules 8 according to FIG. 6. However, for simplicity and clarity of the drawings, illustration of the security elements 16 has been omitted for each rope suspension module 8.

It should be noted that modifications to the above described embodiments are within the common knowledge of the person skilled in the art and, thus, also considered as being part of the present invention. For instance, combinations of the above described embodiments can be realized, where e.g. rope suspension modules with or without keepers and/or with or without security elements can be aligned to a rope suspension device, and so on.

REFERENCE LIST 1 rotorcraft
1a main rotor
2 fuselage
2a tail boom
2b cabin
2c cabin ceiling
2d starboard side wall
2e bottom shell
2f starboard side sliding door opening
3 counter-torque device
4 tail wing
5 fin
6 wheel-type landing gear
6a wheel-type landing gear nose wheels
6b wheel-type landing gear board side rear wheel
6c wheel-type landing gear starboard side rear wheel
7 modular quick release rope suspension device
8 quick release rope suspension module
8a suspension module support frame
8b ceiling frame support structure
8c suspended ropes
8d suspended rope attachment loop
8e suspended rope release movement direction
8f additional rope to be suspended
9 suspension module moveable bar
9a bar attachment opening
9b bar insertion section
9c bar reception section 10 rope suspension load beam
10a load beam hinge pin
10b load beam hinge
10c load beam hinge inclined edge
10d load beam hinge quick release rotating direction
10e load beam longitudinal extension
11 bearing
11a bearing translational rolling movement
12 moveable hinge locking element
12a hinge locking element bearing receptacle
12b hinge locking element inclined edge
13 quick release bar movement direction
14 moveable bar damper
15 load beam damper
16 security pin release device
16a security pin
16b security pin handle
17 keeper
17a keeper rotating pin
17b keeper return spring
17c keeper round edge
17d keeper release rotating direction
18a translational push motion direction
18b translational slide motion direction
19 failsafe pin

What is claimed is:

1. A rope suspension device with at least one rope suspension module that is adapted for suspension of at least one rope from a rotorcraft, the rope suspension module comprising at least one lockable load beam that is rotatable around an axis of rotation between a locked state and an unlocked state and that is adapted for supporting in the locked state at least one rope that is to be suspended from the rope suspension module, the at least one lockable load beam being, upon unlocking in operation, rotatable from the locked state around the axis of rotation into the unlocked state by application of a load to the at least one lockable load beam by means of the at least one rope that is supported by the at least one lockable load beam, wherein:
the at least one lockable load beam is provided with a hinge, the hinge being pivotally mounted to an associated support member;
at least one locking element is provided that is movable between at least a first and a second position, the at least one locking element being adapted for locking the at least one lockable load beam in the first position and for unlocking the at least one lockable load beam in the second position; and
the at least one locking element is translationally movable in a direction that is at least approximately parallel to a longitudinal extension of at least one lockable load beam in locked state.

2. The rope suspension device according to claim 1, wherein the hinge is pivotally mounted to the associated support member by means of an associated hinge pin, the associated hinge pin defining the axis of rotation.

3. The rope suspension device according to claim 1, wherein the associated support member is adapted for mounting the rope suspension module to an associated support structure of a rotorcraft.

4. The rope suspension device according to claim 1 wherein the hinge is provided with an associated failsafe element, the associated failsafe element being adapted for allowing a rotation of the at least one lockable load beam from the locked state around the axis of rotation into the unlocked state only if the at least one locking element is moved to the second position.

5. The rope suspension device according to claim 1 wherein the at least one locking element comprises a first inclined edge and that the hinge comprises a second inclined edge, the first inclined edge being adapted for blocking the second inclined edge in the locked state of the at least one lockable load beam.

6. The rope suspension device according to claim 1 wherein the hinge is provided with a bearing, the bearing being adapted for moving along the at least one locking element in operation during a rotation of the at least one lockable load beam around the axis of rotation from the locked state into the unlocked state.

7. The rope suspension device according to claim 1, wherein the at least one locking element is connected to an actuating member that is activatable for moving in operation the at least one locking element from the first position into the second position.

8. The rope suspension device according to claim 7, wherein the actuating member comprises at least one elongated bar that is moveably mounted to the associated support member.

9. The rope suspension device according to claim 8, wherein the at least one elongated bar is translationally movable in its longitudinal direction along the associated support member for moving the at least one locking element from the first position into the second position.

10. The rope suspension device according to claim 8, wherein the at least one elongated bar is at least approximately arranged in parallel to a longitudinal axis of the at least one lockable load beam in locked state.

11. The rope suspension device according to claim 1, wherein at least one keeper is provided, the at least one keeper being moveable from a latching position into an unlatching position, wherein in the latching position of the at least one keeper the at least one rope that is supported by the at least one lockable load beam in locked state is secured on the at least one lockable load beam, and wherein in the unlatching position of the at least one keeper an additional rope can be mounted to the at least one lockable load beam in locked state.

12. The rope suspension device according to claim 11, wherein at least one operable security element is provided for blocking the at least one keeper in the latching position.

13. The rope suspension device according to claim 1, wherein a dampening element is provided for dampening the at least one lockable load beam upon reaching of the unlocked state after a rotation from the locked state around the axis of rotation into the unlocked state.

14. A rope suspension device with at least one rope suspension module that is adapted for suspension of at least one rope from a rotorcraft, the rope suspension module comprising:
at least one lockable load beam that is rotatable around an axis of rotation between a locked state and an unlocked state and that is adapted for supporting in the locked state at least one rope that is to be suspended from the rope suspension module, the at least one lockable load beam being, upon unlocking in operation, rotatable from the locked state around the axis of rotation into the unlocked state by application of a load to the at least one lockable load beam by means of the at least one rope that is supported by the at least one lockable load beam;
at least one locking element is provided that is moveable between at least a first and a second position, the at least one locking element being adapted for locking the at least one lockable load beam in the first position and for unlocking the at least one lockable load beam in the second position; and an actuating member connected to the at least one locking element wherein the actuating member is activatable for moving in operation the at least one locking element from the first position into the second position, the actuating member including at least one elongated bar that is moveably mounted to the associated support member, the at least one elongated bar being translationally movable in its longitudinal direction along the associated support member for moving the at least one locking element from the first position into the second position.

15. The rope suspension device according to claim 14, wherein the at least one lockable load beam is provided with a hinge, the hinge being pivotally mounted to an associated support member.

16. The rope suspension device according to claim 15, wherein the associated support member is adapted for mounting the rope suspension module to an associated support structure of a rotorcraft.

17. The rope suspension device according to claim 15 wherein the hinge is provided with an associated failsafe element, the associated failsafe element being adapted for allowing a rotation of the at least one lockable load beam from the locked state around the axis of rotation into the unlocked state only if the at least one locking element is moved to the second position.

18. The rope suspension device according to claim 17 wherein the at least one locking element comprises a first inclined edge and that the hinge comprises a second inclined edge, the first inclined edge being adapted for blocking the second inclined edge in the locked state of the at least one lockable load beam.

19. The rope suspension device according to claim 14, wherein the at least one elongated bar is at least approximately arranged in parallel to a longitudinal axis of the at least one lockable load beam in locked state.

20. The rope suspension device according to claim 14, wherein at least one keeper is provided, the at least one keeper being moveable from a latching position into an unlatching position, wherein in the latching position of the at least one keeper the at least one rope that is supported by the at least one lockable load beam in locked state is secured on the at least one lockable load beam, and wherein in the unlatching position of the at least one keeper an additional rope can be mounted to the at least one lockable load beam in locked state.

* * * * *